United States Patent [19]

Pascual

[11] 4,032,493
[45] June 28, 1977

[54] ORIENTED FILM OF STEREOREGULAR POLYPROPYLENE COMPOSITION

[75] Inventor: Miguel Pascual, Wilmington, Del.

[73] Assignee: Hercules Incorporated, Wilmington, Del.

[22] Filed: Sept. 3, 1976

[21] Appl. No.: 720,326

Related U.S. Application Data

[63] Continuation of Ser. No. 601,754, Aug. 4, 1975, abandoned.

[52] U.S. Cl. .................... 260/28.5 A; 260/897 A
[51] Int. Cl.² ................................. C08L 23/00
[58] Field of Search ................ 260/897 A, 28.5 A

[56] References Cited

UNITED STATES PATENTS

| | | | |
|---|---|---|---|
| 3,361,849 | 1/1968 | Cramer et al. | 260/897 A |
| 3,522,198 | 7/1970 | Yamada et al. | 260/28.5 A |
| 3,536,644 | 10/1970 | Frizelle et al. | 260/28.5 A |

*Primary Examiner*—Melvyn I. Marquis
*Attorney, Agent, or Firm*—Clinton F. Miller; Edwin H. Dafter, Jr.

[57] ABSTRACT

The printability with ink of films made from a blend of stereoregular polypropylene and a hydrogenated hydrocarbon polymer is improved by adding to the blend a small amount of a hydrocarbon wax.

4 Claims, No Drawings

ORIENTED FILM OF STEREOREGULAR POLYPROPYLENE COMPOSITION

This is a continuation of application Ser. No. 601,754, filed Aug. 4, 1975, now abandoned.

The present invention relates to oriented films of stereoregular polypropylene. More particularly, it relates to oriented films of a composition comprising a compatible blend of stereoregular polypropylene, a hydrogenated hydrocarbon polymer, and a hydrocarbon wax.

Oriented films of stereoregular polypropylene are well known. These are films which in general appearance resemble films of cellophane and which are generally useful for the same and similar purposes. For many applications of oriented films of polypropylene, it is required that the film be heat sealable. It is known that heat sealability can be improved by addition of a hydrogenated hydrocarbon polymer as taught in U.S. Pat. No. 3,361,849 and in U.S. patent application Ser. No. 861,445, filed Sept. 26, 1969 by Andrew John now Pat. No. 3,666,836. The heat sealable, oriented films made from stereoregular polypropylene containing a hydrogenated hydrocarbon polymer as an additive have been found eminently useful for packaging such items as cigarettes except for one deficiency, this being that the film is not satisfactorily printable with low surface tension inks as are commonly used in printing the tax stamps on cigarette packages. Probably because the surface tension of the film is too low, excessive wetting by the ink results which, in turn, results in the tax stamp being illegible.

In accordance with the present invention it has been found that oriented films prepared from a composition comprising a compatible blend of stereoregular polypropylene, a hydrogenated hydrocarbon polymer (as more fully defined hereafter) and a relatively minor amount of a hydrocarbon wax can be satisfactorily printed with low surface tension inks, thereby overcoming what was previously a serious problem.

The mixture of stereoregular polypropylene, hydrogenated hydrocarbon polymer and hydrocarbon wax which are employed in making the oriented film of this invention are physical mixtures which are readily prepared by conventional methods of mixing and blending employed in the plastics art. The compositions contain from 1 to 60%, more preferably from 5 to 40%, of hydrogenated hydrocarbon polymer based on the weight of polypropylene and from 0.4 to 5%, more preferably from 0.5 to 2.5%, by weight hydrocarbon wax based on the amount of polypropylene.

The expression "stereoregular polypropylene" employed herein is intended to include not only the propylene homopolymer, otherwise called isotactic or crystalline polypropylene, but also the crystalline block copolymer of propylene with minor amounts of another olefin such as ethylene or butene-1. Such copolymers are commonly sold in the trade as polypropylene inasmuch as the presence of the comonomer is not sufficient to materially alter the basic characteristics of the polymer.

The hydrocarbon wax employed in the invention can be either paraffin wax, microcrystalline wax or synthetic wax from the Fischer-Tropsch process. Paraffin waxes suitable for use in this invention are those melting between about 100° F. and 150° F.; suitable microcrystalline waxes are those melting in the range of 150° to 200° F., and the suitable waxes from he Fischer-Tropsch process are those melting in the range of 180° to 220° F. For reasons not apparent, the Fischer-Tropsch waxes are preferred for use in the invention as they do not detract from any property of the film and in fact result in an improvement in blocking characteristics.

The hydrogenated hydrocarbon polymers employed in this invention are amorphous polymerized hydrocarbon materials which are hard, brittle solids at room temperature, have a softening range at elevated temperature, a drop softening point above about 70° C., an average molecular weight (Rast) of about 500 and above, an iodine value less than about 50, and are compatible with the polyolefin. Such polymeric materials include the polymers produced by the hydrogenation of the resinous polymerization products obtained by the catalytic polymerization of mixed unsaturated monomers derived from the deep cracking of petroleum, including the commercially available materials known as "Piccopale", Velsicol XL30, Velsicol ABL-11-4, Panarez 12-210, Neville LX series resins, and the dimers, as well as higher polymers obtaned by polymerization and/or copolymerization of terpene hydrocarbons such as the acyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes, followed by hydrogenation under pressure. "Piccopale 100" is a resin made by the Pennsylvania Industrial Chemical Company and has a softening point (Ball and Ring) of approximately 100 ± 2° C., an iodine value of about 200, and an average molecular weight of approximately 1170; Velsicol XL30 and Velsicol ABL11-4 are made by the Velsicol Chemical Corporation and are understood to be petroleum solids having softening points in the range of 94°-104° C. and 104°-110° C., respectively; Panarez 12-210 is a petroleum solid manufactured by the American Oil Company and has a softening point of 93°-104° C., the Neville resins LX685,125, LX685,135 and LX1000 are hydrocarbon resins manufactured by the Neville Chemical Company and have softening points within the range of 95°-120° C.; Piccotex 120 is a copolymer of alpha-methylstyrene and vinyl toluene having a drop softening point over 100° C. Particularly useful starting materials which can be polymerized and then hydrogenated to form the polymers employed in this invention are mixtures of unsaturated monomers composed essentially of dienes and reactive olefins derived from deep cracking petroleum, the vinyl aromatic hydrocarbon cuts or fractions separated by distilling cracked petroleum, and the terpene mixtures containing at least 20% beta-pinene and/or limonene or dipentene (racemic limonene), and the "sulfate turpentine" obtained as a by-product in the sulfate pulping process. When the starting hydrocarbon is one containing vinyl aromatic hydrocarbons, it is necessary to insure compatibility with the polypropylene that the hydrocarbon polymer have a fairly narrow molecular weight distribution and that at least 50% of the aromatic unsaturation be reduced via hydrogenation.

The polymerization of the petroleum products or the terpene or mixture of terpenes can be carried out in known manner with or without solvent and utilizing a known catalyst such as sulfuric acid, phosphoric acid, fuller's earth, boron trifluoride, amphoteric metal chlorides such as zinc chloride or aluminum chloride, and the like. The polymerization is preferably carried out under conditions which cause substantially all of the hydrocarbon monomer to react with minimum dimer formation.

The hydrogenation of the hydrocarbon polymer can be carried out utilizing a catalyst such as nickel on kieselguhr, copper chromite, palladium on carbon, platinum on alumina, or cobalt plus zirconia on kieselguhr. The hydrogenation is preferably carried out in the presence of a solvent such as methyl cyclohexane, toluene, p-menthane, hydrogenated terpene dimer-trimer, and the like, utilizing pressures ranging from 500 to 10,000 p.s.i. and a temperature between 150° and 300° C.

While any of the aforesaid hydrogenated hydrocarbon polymers having average molecular weights of about 500 (Rast) and above, an iodine value less than about 50, a drop softening point above about 70° C., and compatibility with the polyolefin are operable herein, the preferred hydrogenated hydrocarbon polymers which are particularly effective in providing the impovements in accordance with the invention are characterized by average molecular weights above about 600 (Rast method), softening points above 100° C. (Hercules, drop), iodine values less than about 15, and compatibility with the polyolefin corresponding to a haze value less than about 25%, as determined on a 5-mil film which has been pressed at 232° C. and then quenched.

Preparation of oriented films from the above-described composition is readily done by methods well known in the art. For example, the composition can be extruded as a film through a slot die, and the extruded film can then be oriented in a tenter. Alternatively, the composition can be extruded in tubular form and then oriented by blowing.

While the invention is not limited to a particular theory of operation, it is believed that the improved printability of the films of the invention is due to the migration of the wax to the surface of the film which in turn reduces the wetting of the film by the ink. This theory is in part supported by the fact that aging of the film is required in order to develop optimum printability aging of at most 2 weeks at room temperature or a few hours at slightly raised temperature (41° C.) being sufficient.

The following examples are presented for the purpose of illustrating the invention. Parts and percentages are by weight unless otherwise specified.

EXAMPLE 1

A composition comprising 85 parts of stereoregular polypropylene with normal processing stabilizers, 15 parts of a hydrogenated hydrocarbon polymer, 0.4% submicron clay particles, and 1.7 parts of Paraflint RG wax (a synthetic hydrocarbon wax made by the Fischer-Tropsch process having a melting point of 200° F.) was prepared by dry blending the ingredients and then extruding them in a 1¼ inch Hartig extruder with a water-cooled screw. The resulting blend was then extruded into molding powder pellets and film was made by extruding the molding powder through a 6-inch slot die and casting the extruded sheet onto a water-cooled chrome plated casting roll. The sheet was then biaxially oriented by stretching it approximately 6.25X in each direction while heated to a temperature of 125° C. After orienting, the surfaces of the film were treated by corona discharge by known procedure. Different samples of the film were aged for various periods of time at room temperature (approximately 21° C.) and in an oven at 41° C.

The hydrogenated hydrocarbon resin employed in this example was prepared by hydrogenating a copolymer of about 30% alpha-methylstyrene and 70% vinyl toluene (Piccotex 120) to reduce about 99% of the initial aromatic unsaturation present. The hydrogenation was carried out in an autoclave on a 45% solution of the copolymer in methylcyclohexane using a catalyst comprising nickel on an alkaline treated support. The hydrogenated copolymer had a molecular weight of about 800 with a narrow molecular weight distribution. The drop softening point was 150° C. and it had an iodine value of 0.

The oriented film prepared as above was then evaluated for printability with a low surface tension ink in comparison with a control film which had been prepared identically except for the addition of the wax. Printability tests were then run. In the test, a piece of the film was stapled to a 2×4 piece of lumber with a rubber backing to simulate a carton of cigarettes. The film was then printed in a Pitney-Bowes machine employing the Pitney-Bowes ink regularly employed for imprinting tax stamps on cigarette packages. In accordance with usual procedure, the prints were made in a cold room at about 34° F. The legibility of the imprint from each test was visually estimated.

The legibility of prints made with the wax-containing film was acceptable, while the control films without wax gave prints with consistently poor legibility. Exposure of the films at a slightly elevated temperature (3 hours at 41° C.) prior to printing improved the print legibility on the wax-containing films even further. The prints on the control films did not change with such an exposure.

Further tests on the film of the example showed it to be at least equivalent to the control film in optical properties, coefficient of friction, heat sealability, and ink adhesion while it was somewhat better than the control in resistance to blocking.

EXAMPLE 2

This example was the same as Example 1 except that 2.0 parts of Aristowax (a paraffin wax melting at ~155° F.) was substituted for the Paraflint RG was of Example 1. The resultant film showed good printability by the above-described printing test. The same good printability was observed on another section of the film after oven aging for 16 hours at 47° C. Much less improvement in printability was observed when the example was repeated with 1.0 part of Artistowax indicating that a somewhat greater quantity of this wax is needed than in the case of Paraflint RG.

EXAMPLE 3

Example 1 was twice repeated employing 1.0 and 1.3 parts of Paraflint RG wax, respectively. The film made from the composition containing one part of Paraflint RG showed by the printing test fair to good printability. The film made from the composition containing 1.3 parts Paraflint RG wax showed good printability. Both films showed them to be equivalent to a control film in optical properties, coefficient of friction, heat sealability and ink adhesion and blot.

What I claim and desire to protect by Letters Patent is:

1. A film of a compatible blend of (1) stereoregular polypropylene, (2) a hydrocarbon wax selected from the group consisting of (a) paraffin waxes having a melting point of 100° F. to 155° F., (b) microcrystalline waxes having a melting point of 150° F. to 200° F. and (c) Fischer Tropsch waxes having a melting point of 180° F. to 220° F., and (3) a hydrogenated hydrocarbon polymer having a drop softening point above about 70° C., an average molecular weight of at least 500, and an iodine value less than 50, said hydrocarbon wax being present in the amount of 0.4 to 5% by weight of the polypropylene and said hydrogenated hydrocarbon polymer being present in the amount of 1 to 60% based on the weight of the polypropylene, said film possessing improved printability with low surface tension inks as compared to a film made from a blend of ingredients (1) and (3) alone.

2. The film of claim 1 in which the hydrocarbon wax is a synthetic wax made by the Fischer-Tropsch process.

3. The film of claim 1 in which the hydrogenated hydrocarbon resin is a hydrogenated polyterpene.

4. The film of claim 1 in which the hydrogenated hydrocarbon resin is a hydrogenated copolymer of alphamethylstyrene and vinyl toluene.

* * * * *

UNITED STATES PATENT AND TRADEMARK OFFICE
CERTIFICATE OF CORRECTION

PATENT NO.   :   U.S.P. 4,032,493
DATED        :   June 28, 1977
INVENTOR(S)  :   Miguel Pascual It is certified that error appears in the above-identified patent and that said Letters Patent are hereby corrected as shown below:

Col. 1, first paragraph should read as follows:

"This is a continuation of application Serial No. 601,754, filed August 4, 1975 (now abandoned), which is a continuation of application Serial No. 226,555, filed February 15, 1972 (now abandoned), which latter application is a continuation of application Serial No. 108,970, filed January 22, 1971 (now abandoned)."

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*